United States Patent
Hofmann et al.

(10) Patent No.: US 12,343,814 B2
(45) Date of Patent: Jul. 1, 2025

(54) DEVICE AND METHOD FOR WELDING TOGETHER CONDUCTOR ENDS OF A COMPONENT OF AN ELECTRIC MACHINE

(71) Applicant: GROB-WERKE Gmbh & Co. KG, Mindelheim (DE)

(72) Inventors: Konstantin Hofmann, Mindelheim (DE); René Schürer, Mering St. Afra (DE)

(73) Assignee: GROB-WERKE Gmbh & Co. KG, Mindelheim (DE)

( * ) Notice: Subject to any disclaimer, the term of this patent is extended or adjusted under 35 U.S.C. 154(b) by 762 days.

(21) Appl. No.: 17/034,299

(22) Filed: Sep. 28, 2020

(65) Prior Publication Data

US 2021/0138586 A1  May 13, 2021

(30) Foreign Application Priority Data

Sep. 27, 2019 (DE) .......................... 102019126158.9
May 13, 2020 (EP) ..................................... 20174325

(51) Int. Cl.
| | |
|---|---|
| *B23K 26/00* | (2014.01) |
| *B23K 26/03* | (2006.01) |
| *B23K 26/082* | (2014.01) |
| *B23K 26/24* | (2014.01) |
| *H02K 15/00* | (2025.01) |

(52) U.S. Cl.
CPC ............ *B23K 26/24* (2013.01); *B23K 26/032* (2013.01); *B23K 26/082* (2015.10)

(58) Field of Classification Search
CPC ......... B23K 26/00; B23K 26/03; H02K 15/00
See application file for complete search history.

(56) References Cited

U.S. PATENT DOCUMENTS

| | | | |
|---|---|---|---|
| 5,208,699 A | 5/1993 | Rockwell et al. | |
| 5,472,772 A * | 12/1995 | Jones | B23K 26/26 428/209 |

(Continued)

FOREIGN PATENT DOCUMENTS

| | | |
|---|---|---|
| CN | 107303625 A | 10/2017 |
| DE | 102014002183 B4 | 8/2015 |

(Continued)

OTHER PUBLICATIONS

European Search Report; priority document.

*Primary Examiner* — Steven W Crabb
*Assistant Examiner* — Lawrence H Samuels
(74) *Attorney, Agent, or Firm* — Greer, Burns & Crain, Ltd.

(57) ABSTRACT

A device and a method for welding together conductor ends disposed on a component of an electric machine in a conductor end assembly. To be able to also process larger conductor end assemblies in a safe process, more rapidly and with considerably lower costs, the device includes an illuminating device for illuminating the conductor end assembly, an optical recognition device for recognizing the position of the illuminated conductor ends, a laser device capable of directing, depending on the recognized position, a laser beam onto each group of conductor ends, which is to be welded together, of the entire conductor end assembly, and a mount, by means of which the component is held stationary relative to the laser device during the welding process.

16 Claims, 5 Drawing Sheets

(56) References Cited

U.S. PATENT DOCUMENTS

| | | | | |
|---|---|---|---|---|
| 7,788,791 B2* | 9/2010 | Hara | ............... | H02K 15/0081 29/598 |
| 10,239,154 B2* | 3/2019 | Ciampolini | ............. | H02K 3/50 |
| 10,312,777 B2* | 6/2019 | Fröhlich | ................. | H02K 3/28 |
| 2002/0033649 A1* | 3/2002 | Oohashi | ................... | H02K 3/28 310/201 |
| 2004/0094728 A1* | 5/2004 | Herzog | ................ | B23K 26/08 250/559.22 |
| 2006/0001328 A1* | 1/2006 | Rau | ......................... | H02K 1/16 310/216.004 |
| 2006/0102608 A1* | 5/2006 | Katsuta | ............ | B23K 26/0853 219/121.83 |
| 2006/0141874 A1* | 6/2006 | Lenoir | ................... | B23K 26/26 439/874 |
| 2006/0151451 A1* | 7/2006 | Smith, Jr. | ......... | B29D 30/0061 219/121.68 |
| 2009/0302011 A1* | 12/2009 | Behr | .................... | B23K 26/044 219/121.64 |
| 2010/0044350 A1* | 2/2010 | Heiml | ..................... | B23P 21/00 228/103 |
| 2010/0078413 A1* | 4/2010 | Hosokawa | ........... | B23K 26/242 219/121.84 |
| 2011/0168678 A1* | 7/2011 | Takeda | ............... | B23K 15/0093 219/74 |
| 2012/0145771 A1* | 6/2012 | Bohlin | ................ | B23K 9/0956 228/9 |
| 2012/0181259 A1* | 7/2012 | Kwong | ................... | H01L 31/18 219/201 |
| 2013/0015171 A1* | 1/2013 | Breitenbach | ........ | B23K 9/1735 219/136 |
| 2013/0075371 A1* | 3/2013 | De Souza | ........... | B23K 31/125 219/109 |
| 2015/0151384 A1* | 6/2015 | Honegger | ........... | B23K 26/384 408/2 |
| 2015/0202717 A1* | 7/2015 | Bruck | .................. | B23K 26/342 419/53 |
| 2016/0052056 A1* | 2/2016 | Fager | ..................... | B22F 12/45 219/76.12 |
| 2016/0144457 A1 | 5/2016 | Karsikas et al. | | |
| 2016/0303686 A1* | 10/2016 | Ciampolini | ........ | H02K 15/0081 |
| 2017/0129180 A1* | 5/2017 | Coates | ............... | B23Q 11/0046 |
| 2017/0297144 A1 | 10/2017 | Nakanishi | | |
| 2017/0310198 A1* | 10/2017 | Fröhlich | ................. | H02K 3/12 |
| 2018/0141164 A1* | 5/2018 | Schulz | .................. | B23K 26/16 |
| 2020/0153319 A1 | 5/2020 | Reiser et al. | | |

FOREIGN PATENT DOCUMENTS

| | | |
|---|---|---|
| DE | 102018103100 A1 | 1/2019 |
| DE | 102018103926 A1 | 8/2019 |
| DE | 102018103929 A1 | 8/2019 |
| DE | 102018103930 A1 | 8/2019 |
| EP | 2886239 B1 | 6/2015 |
| EP | 3088124 A1 | 11/2016 |
| EP | 2986412 B1 | 10/2018 |
| WO | 2014170551 A1 | 10/2014 |

\* cited by examiner

DEVICE AND METHOD FOR WELDING TOGETHER CONDUCTOR ENDS OF A COMPONENT OF AN ELECTRIC MACHINE

CROSS-REFERENCES TO RELATED APPLICATIONS

This application claims the benefit of the German patent application No. 102019126158.9 filed on Sep. 27, 2019, and of the European patent application No. 20174325.9 filed on May 13, 2020, the entire disclosures of which are incorporated herein by way of reference.

FIELD OF THE INVENTION

The invention relates to a device for welding together conductor ends disposed on a component of an electric machine in a conductor end assembly. The invention further relates to a method for welding together conductor ends disposed on a component of an electric machine in a conductor end assembly.

BACKGROUND OF THE INVENTION

Electric machines are understood to be, in particular, machines for converting electrical energy into kinetic energy and machines for converting kinetic energy into electrical energy. In particular, this term is to be understood to mean electric motors and generators.

When manufacturing components of such electric machines, such as stators and rotors, for example, it is often necessary to process ends of electrical conductors formed from wires together, such as cut them or shape them together, for example, and to connect them.

For instance, there are electric motors in which coil windings, particularly of the stator, are formed from different wire pieces whose ends are then connected together. Devices and methods for connecting wire ends of hairpins in order to form stator windings of electric machines have already been proposed, in which the wire ends are welded together. Here, devices and methods for positioning and clamping the wire ends prior to welding and devices and methods for welding together the wire ends thus clamped are provided.

A preferred area of application of the present invention is in the field of the production of electric motors or other electric machines, such as generators, for example, which are designed for high performance, reliable operation and high efficiency. In particular, electric motors are to be produced that can be used as driving engines of electric vehicles or hybrid vehicles and have a nominal output of between 20 kW and 400 kW, for example. In order to build stators of such high-performance electric machines, it is advantageous to provide as high a coil density as possible.

For this preferred area of application, the following sources
[1] DE 10 2018 103 926 A1
[2] DE 10 2018 103 929 A1
[3] DE 10 2018 103 930 A1,
to which express reference is made with respect to further details, describe devices and methods for shaping wire ends of hairpins and a manufacturing method for a component of an electric machine using the same. The devices and methods described in the sources serve, in particular, for shaping the hairpin wire ends that are being connected with each other in order thus to form coil windings. The connection is effected by welding, for example, for which it is advantageous to use devices and methods for positioning and clamping the hairpin wire ends described and illustrated in the source
[4] DE 10 2018 103 100 A1,
to which express reference is made with respect to further details.

Devices and methods for processing materials by means of laser beams are known from the following sources:
[5] U.S. Pat. No. 5,208,699 A
[6] WO 2014/170551 A1
[7] US 2010/0078413 A1
[8] EP 2 886 239 B1
[9] DE 10 2014 002 183 B4

Source [5] describes a device for delivering high-energy laser beams. A device for marking steel plates by means of a laser beam is know from source [6]. A device for welding a lid to a housing of a secondary battery for a vehicle is known from source [7], wherein the welding beam is moved in a manner not shown across the welding seam site, and wherein the housing is held by means of a clamping device with clamping jaws, through which blocking air can be guided towards the welding seam site. Devices for laser welding a first workpiece and a second workpiece at a joint are known from the sources [8] and [9], wherein the welding process is controlled by recording an image of the joint and by image processing for detecting the position of the joint.

From the source
[10] EP 3 088 124 A1,
a device and a method are known for laser welding two adjacent conductor ends of a stator winding of an electric machine as a driving engine for a vehicle. Here, the two conductor ends are clamped together; then, the position of the joint is detected by recording an image and by image processing, and a welding process is carried out by means of two welding seams crossing the joint.

Now, components of such high-performance electric machines are relatively large and, corresponding to the desired high energy density, a large number of coil windings have to be produced, which necessitates the connecting with each other of a large number of conductor ends protruding from a relatively large component.

SUMMARY OF THE INVENTION

An object of the invention is to provide a device and a method with which conductor ends that protrude in a complex conductor end assembly even on a larger component, which is to be produced on a large scale, of an electric machine can be welded together quickly, but nevertheless in a reliable process, with less effort.

The invention, according to one aspect thereof, provides a device for welding together conductor ends disposed on a component of an electric machine in a conductor end assembly, comprising:
an illuminating device for illuminating the conductor end assembly,
an optical recognition device for recognizing the position of the illuminated conductor ends, wherein the optical recognition device is configured for recording one or several images of at least a partial area of the conductor end assembly with several conductor end groups to be welded together and detecting the positions of the several conductor end groups by image processing,
a laser device capable of directing, depending on the recognized position, a laser beam onto each group of conductor ends, which is to be welded together, of at least the partial area of the conductor end assembly, and a mount, by means of which the component is held stationary relative to the laser device during the welding process for welding together all conductor end groups of at least the partial area of the conductor end assembly.

For example, both the mount and the laser device are held stationary while all conductor end groups of the entire partial area are welded together.

Preferably, the illuminating device comprises a panel lamp for illuminating the entire conductor end assembly. Alternatively, the illuminating device may be configured such that the partial area is illuminated.

Preferably, the partial area is dimensioned in such a way that a plurality of the groups to be welded together is covered, e.g., at least half, a third, a fourth or a fifth of all conductor end groups of the conductor end assembly that are to be welded together. For example, the partial area includes at least four conductor end groups to be welded together (e.g., pin pairs). In particular, the partial area includes at least eight conductor end groups to be welded together. Preferably, the partial area includes at least ten, more particularly 10 to 40 conductor end groups to be welded together. For example, the partial area includes 15 to 25 or up to 30 conductor end groups to be welded together.

Preferably, the illuminating device comprises an assembly of individual light sources.

Preferably, the illuminating device comprises an assembly of individual bores for forming individual light sources.

Preferably, the illuminating device comprises a uniform distribution of individual light sources.

Preferably, the illuminating device comprises a light conducting device for uniformly distributing light power to individual light sources.

Preferably, the illuminating device comprises an illuminating optics assembly by means of which the entire conductor end assembly can be illuminated.

In one embodiment, it is provided that the laser device is stationary. According to another exemplary embodiment, it is provided that the laser device is configured for being moved between the processes for welding together partial areas of the conductor end assembly. Optionally, the illuminating device may be moved along; for example, it is placed on a head of the laser device to be moved.

Preferably, the laser device is or includes a laser optics assembly with a laser beam entrance for inputting a laser beam, a scanning device for directing the laser beam and at least one lens for influencing the laser beam. In one embodiment, the laser optics assembly is stationary relative to the mount; only mirrors or other deflecting elements of the scanning device are movable in order to be able to direct the laser beam onto every point in a relatively large processing area including the entire conductor end assembly. In another embodiment, the laser optics assembly is movable relative to the mount, but configured in such a way—in particular by a correspondingly configured control system—that it is held stationary for welding together all conductor end groups of each partial area of the conductor end assembly—wherein only the mirrors or other deflecting elements direct the laser beam—but can be moved relative to the mount for processing different partial areas.

Preferably, the laser device enables a deflection of the laser beam over a processing area at the conductor end assembly with a diameter of 300 mm or more. Of course, components with a diameter of less than 300 mm can also be processed.

Preferably, the laser device has a laser beam source with a power range between 1 and 8 kW, preferably between 3 to 6 kW, and more preferably between 4 and 6 kW.

Preferably, the laser device is configured for obtaining a laser beam with a beam diameter at the focus of between 50 µm and 200 µm, preferably between 100 µm and 200 µm.

Preferably, the laser device is configured in such a manner that a laser radiation with an intensity I of preferably I>106 W/cm2 is obtained by setting the beam diameter at the conductor end assembly.

Preferably, the laser device has a light conducting cable for guiding the laser beam towards the scanning device.

Preferably, the laser device has a light conducting cable with a fiber core diameter of 50 µm to 300 µm, preferably of 50 µm to 150 µm, disposed upstream of the scanning device in the beam direction.

Preferably, the device includes a flow generation device for generating a gas flow over the conductor end assembly.

Preferably, the device includes several nozzles for generating a gas flow, which is at least partially directed in the tangential direction, at the conductor end assembly.

Preferably, a stationary welding template with openings, in which the conductor ends of the conductor end assembly that are to be welded together are to be accommodated, is provided.

A preferred embodiment of the device comprises a first and a second welding station, which are supplied with laser power by a common laser beam source.

According to another aspect, the invention provides a welding assembly comprising a device according to any one of the preceding embodiments and the component.

According to another aspect, the invention provides a method for welding together conductor ends disposed on a component of an electric machine in a conductor end assembly, comprising:

a) illuminating at least a partial area of the entire conductor end assembly, b) optically recognizing the position of the conductor ends of the illuminated conductor end assembly by recording at least one image of at least the partial area of the conductor end assembly and carrying out image processing in order to detect the position of each group of conductor ends to be welded together within the partial area of the conductor end assembly, c) deflecting a laser beam, depending on the recognized position, onto each conductor end group to be welded together, at least for the partial area of the entire conductor end assembly, in order thus to weld the conductor end groups together, d) wherein the component is held stationary, during the welding process according to step c), relative to the laser device delivering the laser beam.

In smaller stators or other components, for example, the entire conductor end assembly is recorded in one or several images and welded together with a laser device held stationary relative to the mount. In the case of particularly large components, it is preferred to divide the conductor end assembly into two, three, four, five or six partial areas and carry out the process on each partial area with a laser device held stationary relative to the mount. Each partial area, however, contains a plurality of groups of conductor ends to be welded together, e.g., at least 10 conductor end pairs. As a result, the position of at least 10 conductor end pairs can be determined simultaneously by means of a single computing process in the image processing. For example, the partial area includes at least four conductor end groups to be welded together (e.g., pin pairs). In particular, the partial area includes at least eight conductor end groups to be welded together. Preferably, the partial area includes at least ten, more particularly 10 to 40 conductor end groups to be welded together. For example, the partial area includes 15 to 25 or up to 30 conductor end groups to be welded together.

Preferably, step a) comprises the step:

a1) illumination of the conductor end assembly with light characteristics that are constant across the entire processing surface including the conductor end assembly.

Preferably, step a) comprises the step:

a2) guiding light for light emission for the purpose of illuminating by means of a light conductor.

Preferably, step a) comprises the step:

a3) illumination by means of a uniform assembly of individual light sources.

Preferably, step a) comprises the step:

a4) emitting the light through an assembly of bores as individual light sources.

Preferably, step a) comprises the step:

a5) guiding and influencing the light for illumination by means of at least one illuminating optics assembly.

Preferably, step b) comprises the step:

b1) recognizing the position, by means of imaging processes, of conductor ends to be welded together.

Preferably, step b) comprises the step:

b2) recording at least one image of at least one section of the processing surface including the conductor end assembly.

One possible embodiment provides that step b) comprises the step:

b3) recording at least one image of the entire conductor end assembly.

Preferably, step b) comprises the step:

b4) recognizing edges of conductor ends in a recorded image and computing, based on the recognized edges, the position of a center of a group of conductor ends to be welded together.

Preferably, step b) comprises the step:

b5) recognizing differently oriented edges of conductor ends in a recorded image in order to detect a position of a group of conductor ends to be welded together.

Preferably, step b) comprises the step:

b6) recording at least one image by means of a camera disposed in or on a stationary laser optics assembly including a scanning device for carrying out step c).

Preferably, step c) comprises the step:

c1) guiding laser light with a power of 1 to 8 kW, preferably 3 to 6 kW, particularly preferably 4 to 6 kW, to a scanning device.

Preferably, step c) comprises the step:

c2) guiding laser light to a scanning device by means of a light conducting fiber with a fiber core diameter of 50 μm to 300 μm, preferably of 50 μm to 150 μm.

Preferably, step c) comprises the step:

c3) setting a beam diameter of 100 μm to 200 μm at the welding site on the group of conductor ends to be welded together.

Preferably, step c) comprises the step:

c4) setting a beam diameter at the welding site on the conductor end group to be welded together, such that a beam intensity of preferably more than 106 W/cm2 is attained.

Preferably, step c) comprises the step:

c5) carrying out the welding process at speeds of 200 to 1000 mm/s, preferably 600-1000 mm/s, preferably 800 mm/s to 1000 mm/s Preferably, step c) comprises the step:

c6) scanning the laser beam over a processing area at the conductor end assembly, wherein the processing area has a diameter of 300 mm or more. Preferably, components with a diameter of 300 mm or more can be processed in this manner without a relative movement of the component and the laser optics assembly.

Of course, however, components such as stators with a diameter of less than 300 mm can also be processed. Since the conductor end in the conductor end assembly are optically acquired in total, the processing of smaller components does not require any change to the device implementing the method, or its control system or controlling software; in that case, only a part of the processing area is used.

Preferably, step d) comprises the step:

d1) holding the component stationary.

Preferably, step d) comprises the step:

d2) disposing the conductor end assembly in a stationary welding template.

One embodiment provides that step d) comprises the step:

d3) using a stationary laser device including the scanning device and at least one lens.

A movable laser device is used in another embodiment. The laser device is held stationary relative to the mount for this purpose, for acquiring the position and welding together all conductor end groups (e.g. at least 10 groups of conductor ends to be welded together) of each partial area of the conductor end assembly, and moved relative to the mount only for switching from one partial area to the next.

Preferably, the method comprises the step:

e) generating a gas flow over the conductor end assembly during welding.

Preferably, the method comprises the step:

e1) generating several individual gas flows directed at least partially in the tangential direction, in order to generate a circulating gas flow over the conductor end assembly during welding.

e2) generating a radially directed gas flow over the conductor end assembly.

Preferably, the method according to any one of the preceding embodiments is carried out at a first welding station and at a second welding station using the same laser for generating the laser radiation.

Preferably, simultaneously, the steps a) and b) run on one of the welding stations, alternating with step c) on the other welding station.

Preferably, the device according to any one of the preceding embodiments is configured for carrying out the method according to any one of the preceding embodiments. Preferably, the method according to any one of the preceding embodiments is carried out on a device according to any one of the preceding embodiments.

Preferred embodiments of the device comprise a control system—e.g., programmed accordingly—which is configured for controlling the device according to any one of the preceding embodiments in order to carry out the method according to any one of the preceding embodiments.

Another aspect of the invention provides a computer program product comprising machine-readable control instructions which, when loaded into a control system of a device according to any one of the preceding embodiments, cause the device to carry out the method according to any one of the preceding embodiments.

The subject matter of the invention are a device and a method for welding together conductor ends. More particularly, the invention relates to a device and a method for welding together hairpins.

In particular, the invention relates to welding without manipulation, particularly of the component and/or the laser unit.

More particularly, a device and a method are proposed with which conductor ends on a component of an electric machine, even in the case of greater components, e.g. large-diameter stators, and/or even in the case of a greater number of conductor ends to be welded together, can be welded together without the welding unit and/or the component having to be moved. The preferred area of application of the invention is electromobility, and more particularly the manufacture of components of electric machines that can be used as driving engines of motor vehicles. In particular, the invention is to be used in the large-series production of such components. Therefore, one embodiment of the invention also relates to an installation for manufacturing a component of an electric machine on a large scale, comprising a device according to any one of the preceding embodiments.

Currently, contacting copper wires or similar conductor ends to be electrically interconnected is most frequently effected by substance-to-substance connections that can be realized by means of different welding methods. For this purpose, in addition to various beam welding methods, such as laser beam or electron beam welding, arc-based methods such as WIG and plasma welding are established in the prior art.

In preferred uses of the method and the device according to exemplary embodiments of the invention, the pins to be contacted are welded together, at their end faces at their free ends, in a parallel joint, the geometry of the welding connection forming a bead-shaped or hemispherical contour. More preferably, depending on the required mechanical and electrical properties, the bond cross-section is set individually via the melt volume or the bead height. During the welding process, an energy input over a surface takes place, preferably in such a manner that the end face is melted completely, resulting in a closed melt cover. In detail, the energy in preferred embodiments is input along a characteristic welding contour whose geometry and dimension is chosen based on the wire cross section. The dimension of these contours extends over the entire cross section of the pin pair, so that a constant and uniform melt cover is produced. Depending on the required bond cross section, a characteristic melt volume is desired. Preferably, the welding contour is crossed multiple times for this purpose, so as to result in a characteristic number of irradiation changes between the pins.

Stators of driving engines of motor vehicles have relatively large dimensions. On the other hand, the processing areas of current laser welding units is limited due to different factors. Therefore, the component until now had to be moved through the processing area, e.g., by rotating the component with the clamped conductor ends about a central axis of the component or by moving the laser optics assembly, in order to carry out the welding of the pin pairs successively.

Preferred embodiments of the invention enable a laser beam welding of a stator without local manipulation, i.e., rotation, of the stator and/or moving the laser optics assembly. Preferred embodiments of the invention enable a complete illumination of the stator in the stationary case, so that a suitable lighting situation for recognizing the pins through vision systems is possible. In embodiments of the invention for processing particularly large stators or the like, the conductor end assembly is divided into a few partial areas each having a plurality of the pins to be welded together, and the pins of the entire partial area are welded together in a stationary manner, so that a movement only has to be carried out between the few partial areas. Computing times and process times can be reduced considerably also in this manner.

The optical configurations of the welding optical system provided in approaches until now contained focal lengths/working distances, resulting in scanning field sizes enabling only the welding of those conductor ends projecting from individual grooves of the stator. Accordingly, rotating the stator or moving the optical assembly in a time-consuming manner is required in order to successively move the grooves to be welded into the operating section of the laser optics assembly. This is accompanied by drawbacks with regard to the cycle time and thus of the output.

In this connection, the conventionally available lamps based on LED technology permit only a locally limited illumination of the stator. In detail, only the area of the scanning field relative to the stator position is illuminated in this case.

So far, the detection of the pin position was on a pin-by-pin basis, i.e., each pin pair is detected in a single image, resulting in long detection and computing times.

Advantageous embodiments of the invention enable a detection of the entire conductor end assembly or of a large partial area of the conductor end assembly and an image processing of the overall image of the entire conductor end assembly, or of at least the partial area thereof. Preferably, a complete illumination of the conductor end assembly is provided. The conductor end assembly can be acquired in total; the position of the individual pins to be welded can be detected therein. Thus, detection and computing times can be reduced. In preferred embodiments, this is achieved, in particular, by means of a combination of suitable focal lengths/working areas of the laser optics assembly with a corresponding lighting system. Preferably, greater working distances than used so far are provided. The large working distances enable large scan fields/working fields of the optical assembly, which cover the entire stator or large partial areas, e.g. at least half or a third or a fourth, so that neither the stator nor the optical assembly have to be moved for a complete welding of all the pins of the entire stator or of the partial area. This permits the use of a stationary welding template having neither rotational nor translational degrees of freedom. If required, only a moving apparatus for the laser optics assembly has to be provided, which moves the latter only for switching between the partial areas.

Moreover, the use of a panel lamp permits a stationary illumination of the pin pairs so as to yield a shadow-free lighting result. Thus, all the pins of the stator are illuminated at the same time, so that suitable boundary conditions for image acquisition result.

Software extensions permit a multiple detection of pin pairs, which may be expanded to a segment-by-segment detection. This permits a cycle time reduction and thus constitutes an advantage with respect to the process.

BRIEF DESCRIPTION OF THE DRAWINGS

Exemplary embodiments of the invention will be explained in more detail below with reference to the attached drawings. In the drawings.

DETAILED DESCRIPTION OF THE PREFERRED EMBODIMENTS

Figure 1:
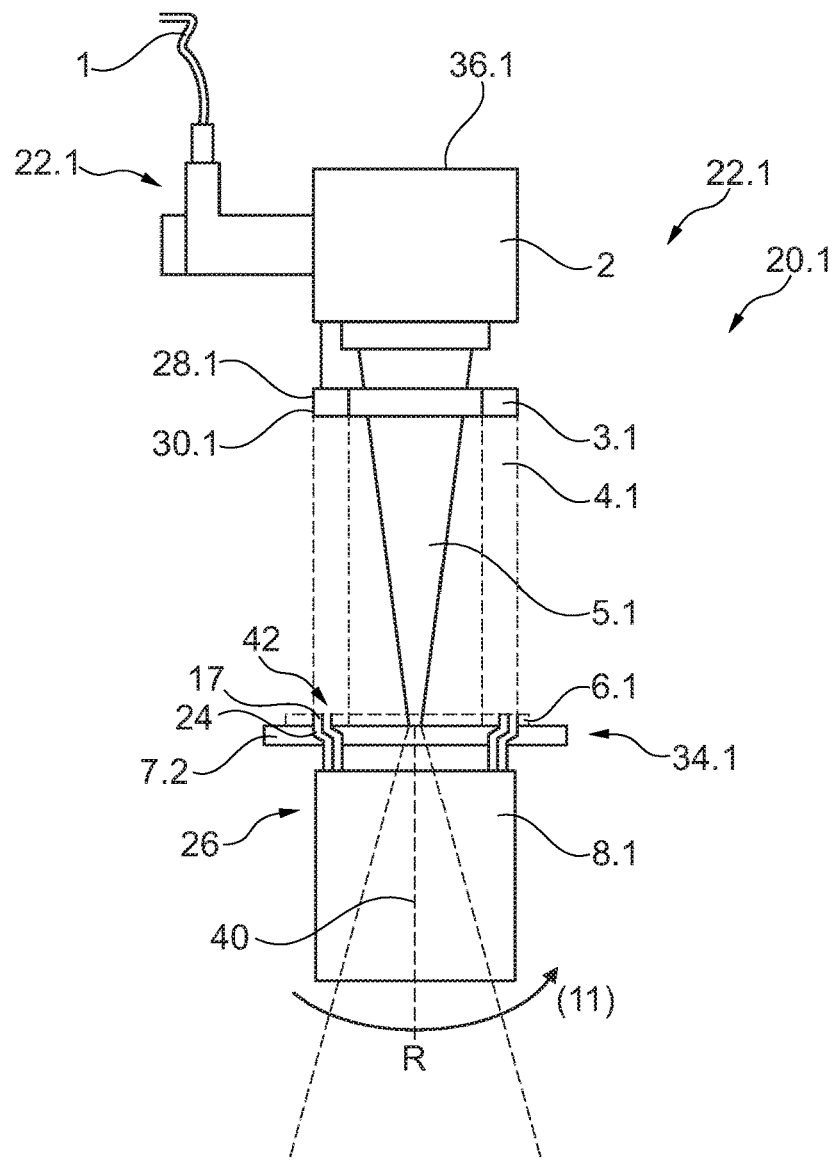
FIG. 1 shows a side view of a welding assembly according to a comparative example of a previous approach, comprising a device for welding together conductor ends according to the comparative example and a component in the form of a stator.
Figure 4:
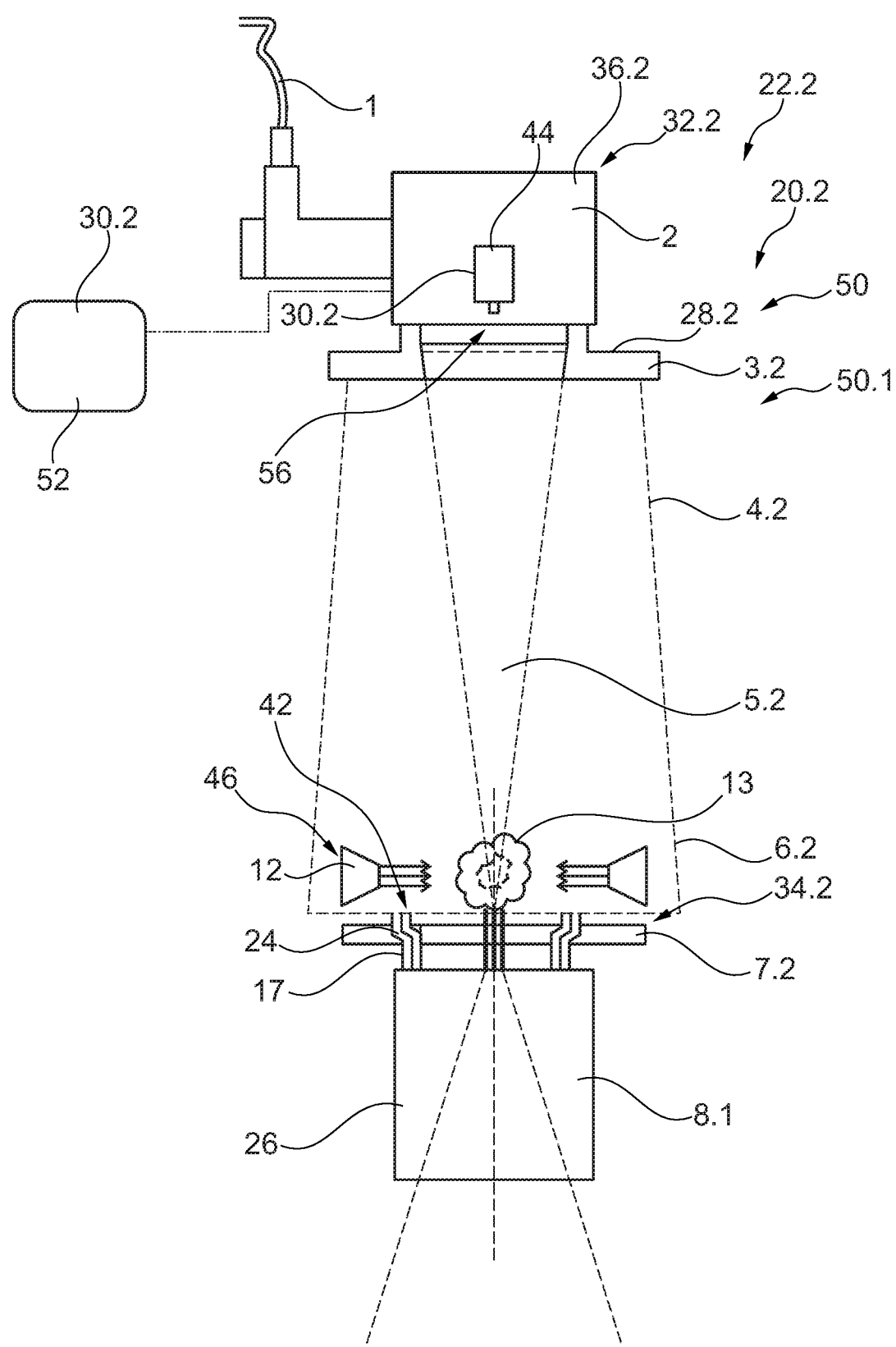
FIG. 4 shows a side view of a welding assembly according to an exemplary embodiment of the invention, comprising a device for welding together conductor ends according to an embodiment of the invention and a component in the form of a stator.

FIGS. 1 and 4 show different welding assemblies 20.1, 20.2. FIG. 1 shows a welding assembly 20.1 according to a comparative example of a previous approach, and FIG. 4 shows a welding assembly 20.2 according to a first exemplary embodiment of the invention. First, the common features of the welding assemblies 20.1, 20.2 are described below, with corresponding components being provided with the same reference numeral.

The welding assembly 20.1, 20.2 in each case comprises a device 22.1, 22.2 for welding together conductor ends 24 protruding from a component 26, as well as the component 26 to be processed.

In a preferred exemplary embodiment, the component 26 is a stator 8.1 of an electric motor to be used as a driving engine for motor vehicles. The stator 8.1 is produced in accordance with a production method as it is described and illustrated in detail in the sources [1]-[4]. The devices 22.1, 22.2 described herein serve for carrying out the welding process, which is described in these sources, for connecting conductor ends 24 protruding from the stator 8.1 in order thus to form coil windings of the stator. In particular, the conductor ends 24 are the free ends of hairpins 17 that have been inserted into grooves of a housing of the stator 8.1. Accordingly, the conductor ends 24 are also referred to as pins; a pair of conductor ends 24 to be welded together is also referred to as a pin pair.

The device 22.1, 22.2 comprises an illuminating device 28.1, 28.2, an optical recognition device 30.1, 30.2, a laser device 32.1, 32.2 and a mount 34.1, 34.2.

The illuminating device 28.1, 28.2 serves for illuminating conductor ends 24.

The optical recognition device 30.1, 30.2 is configured for recognizing conductor ends 24 illuminated by the illuminating device 28.1, 28.2 and to detect their position in a coordinate system 10.

The laser device 32.1, 32.2 is configured for directing, depending on the detected position, a laser beam 5.1, 5.2 onto the conductor ends 24 in order thus to weld the conductor ends together. For directing the laser beam 5.1, 5.2, the laser device 32.1, 32.2 has a scanning device 36.1, 36.2.

The mount 34.1, 34.2 serves for holding the component 26 and the conductor ends 24 during the welding process. For this purpose, the mount 34.1, 34.2 has, as a welding template, a clamping device 7.2 which may be configured in the manner described and illustrated in more detail in the source [4].

Figure 2:
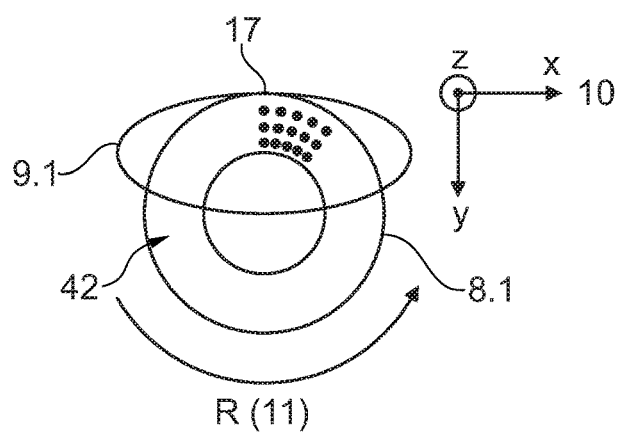
FIG. 2 shows a plan view of the component, held in a mount, of the comparative example of FIG. 1.
Figure 3:
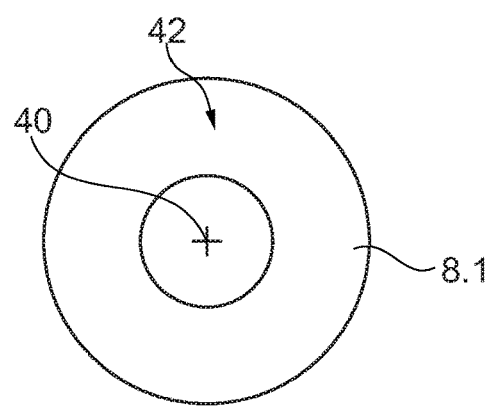
FIG. 3 shows a schematic sketch of the mount of the comparative example.

With reference to the FIGS. 1-3, the welding assembly 20.1 according to the comparative example according to an earlier approach and its components 22.1, 28.1, 30.1, 32.1 and 34.1 are described in more detail below. The laser device 32.1 is optimized for applying as large a part of the laser energy to the conductor ends 24 to be welded together, and thus has a relatively small working distance of less than 300 mm. The scanning device 36.1 has a scanning field 9.1 and thus a processing area within which the laser beam 5.1 can be guided, which covers the radial extent of a groove of the ring housing of the stator 8.1. The mount 34.1 has a rotating mechanism for rotating the clamping device 7.2 and the stator 8.1 retained thereon about a central axis 40. By means of the rotation, the entire circumference of the ring housing can be rotated through the processing field 9.1 of the scanning device 36.1.

Due to the large dimensions of the stator 8.1, which partially exceed the processing area 9.1 of the laser optics assembly 2 of the laser device 32.1, the stator 8.1 is rotated via a C-axis—central axis 40—in order to move the pin pairs of the hairpin 17 that are to be welded together into the processing area 9.1. The direction of rotation 11 is indicated in FIGS. 1 and 2.

In an alternative approach according to another comparative example not shown here in any detail, this may be realized by means of a translational movement of the laser optics assembly 2 of the laser device 32.1.

For this purpose, focusing lengths/working distances of 255 mm or 294 mm are provided for the laser optics assembly 2 of the laser device 32.1. This focal length results in a scanning field—processing area 9.1 of the laser device 32.1—which covers (depending on the type) approx. five to ten grooves with the conductor ends 24 protruding therefrom, so that the stator 8.1 cannot be welded together completely without manipulation. In accordance with the above-mentioned dimensions of the scanning field, the illuminating device 28.1 is configured in such a manner that a comparable working area is illuminated. The illuminating device 28.1 has a ring light 3.1 for this purpose. The resulting light cone 4.1 of the ring light 3.2 is shown in FIG. 1. At the same time, the above-described welding strategy requires a rotating welding template. Accordingly, it is difficult to form an air curtain 6.1 in order to keep away particles produced by welding.

With reference to the FIGS. 4-8, the welding assembly 20.2 according to the first exemplary embodiment of the invention and exemplary embodiments of its components 22.2, 28.2, 30.2, 32.2 and 34.2 are described in more detail below.

The illuminating device 28.1 is configured for illuminating, as a whole, the entire conductor end assembly 42 of all conductor ends 24 protruding from the component 26. The illuminating device 28.1 has a panel lamp or panel light 3.2 for this purpose. Whereas the light cone 4.1 of the ring light 3.1 in FIG. 1 illuminates only a part of the conductor ends in a very limited manner, the light cone 4.2 of the panel light 3.2 illuminates all the conductor ends 24 of the entire conductor end assembly 42. The panel light 3.2 is configured in such a way that the entire conductor end assembly 42 is uniformly illuminated, so that constant light characteristics are present.

Accordingly, the optical recognition device 30.2 is configured to record by means of a camera 44 located in the region of the laser optics assembly 2 all the conductor ends 24 of the conductor end assembly 42 in several images and to detect the position of all these conductor ends 24 in the coordinate system 10 by means of a corresponding image processing.

Compared with the comparative example and previous approaches, the laser optics assembly 2 of the laser device 32.2 is farther away from the plane of the conductor ends 24. The scanning device 26.2 has a significantly larger processing field 9.2, which in the first exemplary embodiment extends across the entire conductor end assembly 42 with all conductor ends 24.

Figure 6:
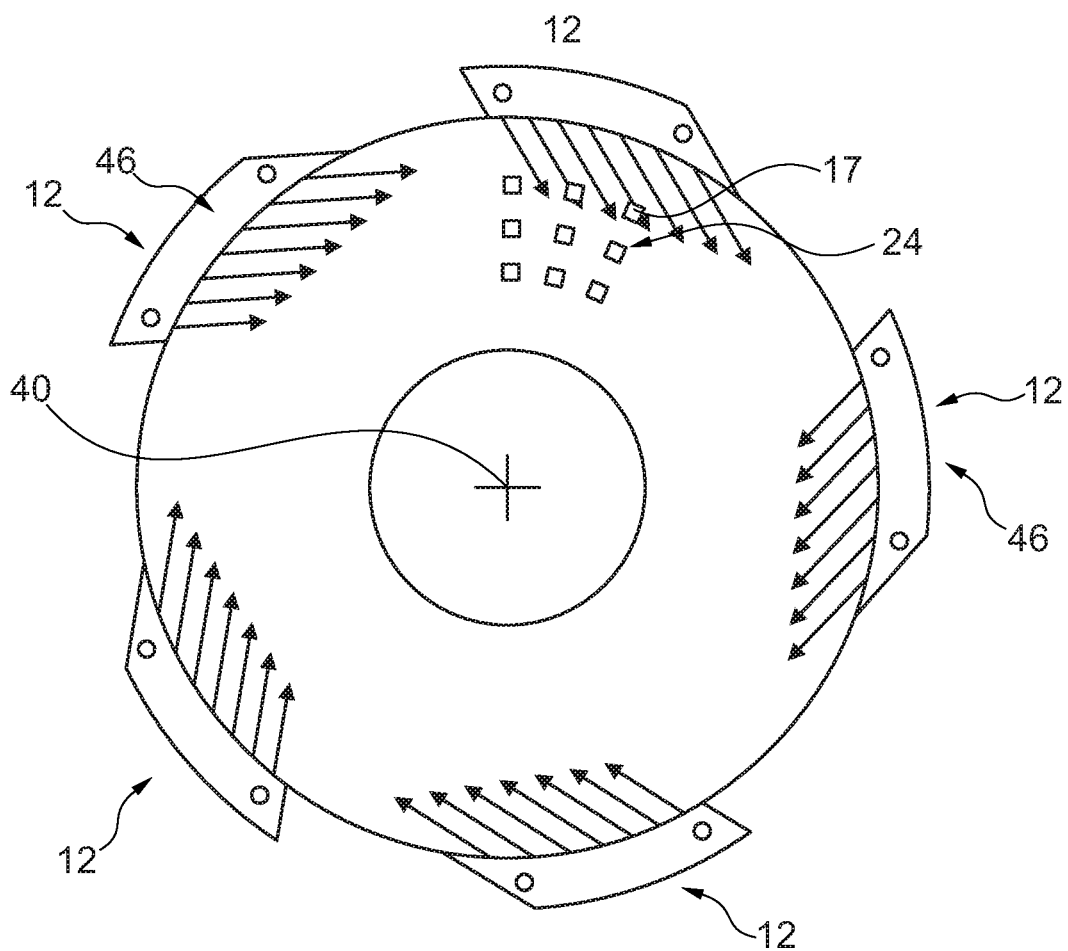
FIG. 6 shows a detailed view of an embodiment of the mount of the exemplary embodiment of FIG. 4.
Figure 7:
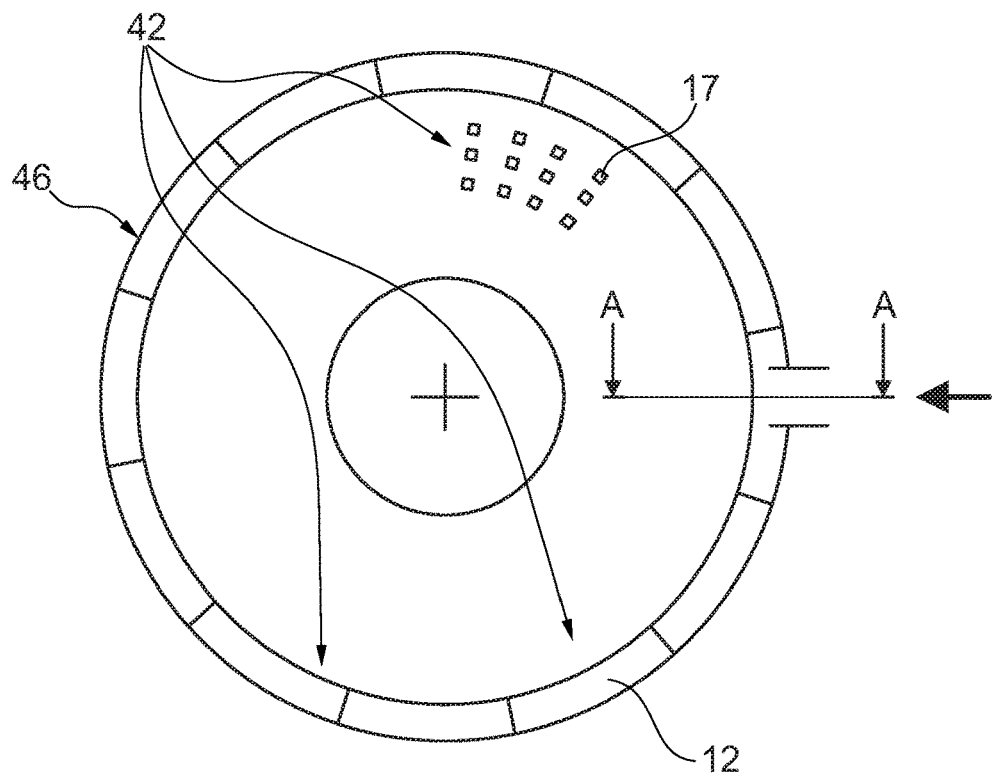
FIG. 7 shows a detailed view of another embodiment of the mount of the exemplary embodiment of FIG. 4.

The mount 34.2 is stationary relative to the laser optics assembly 2 of the laser device 32.2. In particular, both the laser optics assembly 2 and the mount 34.2 are disposed in a stationary manner, e.g., on a common machine bed. As a result, the clamping device 7.2 is also stationary. A flow generation device 46 and an air curtain 6.2 generated by it can be provided in a simple manner Two exemplary embodiments of the flow generation device 46 are illustrated in FIGS. 6 and 7. The flow generation device 46 has several air nozzles 12. In the embodiment according to FIG. 6, the air curtain 6.2 is configured in a segmented manner, with an obliquely directed flow. In the embodiment according to FIG. 7, the air nozzles 12 are configured peripherally, with a flow direction oriented towards the center.

Figure 8:
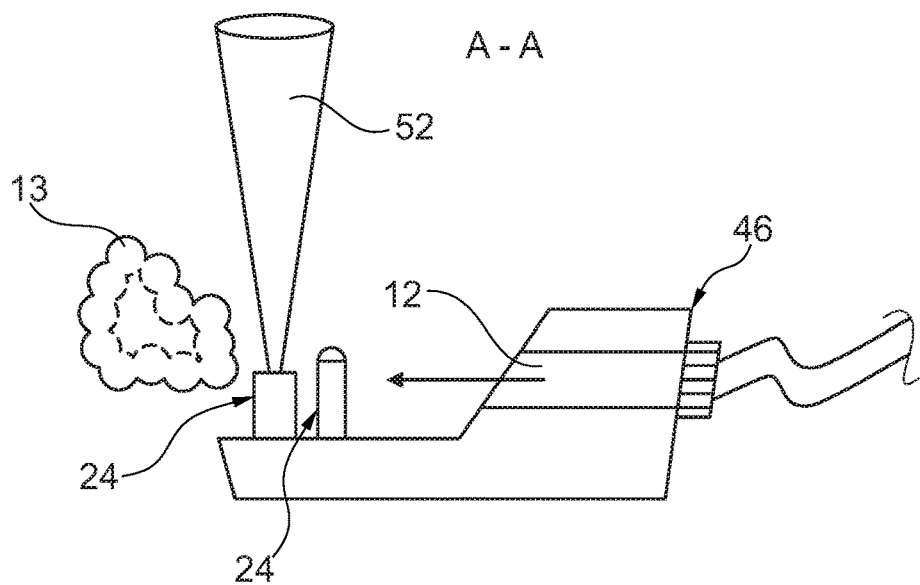
FIG. 8 shows a detail of a flow generation device of the mount according to FIGS. 6 and 7 for illustrating its function during the welding process.
Figure 9:
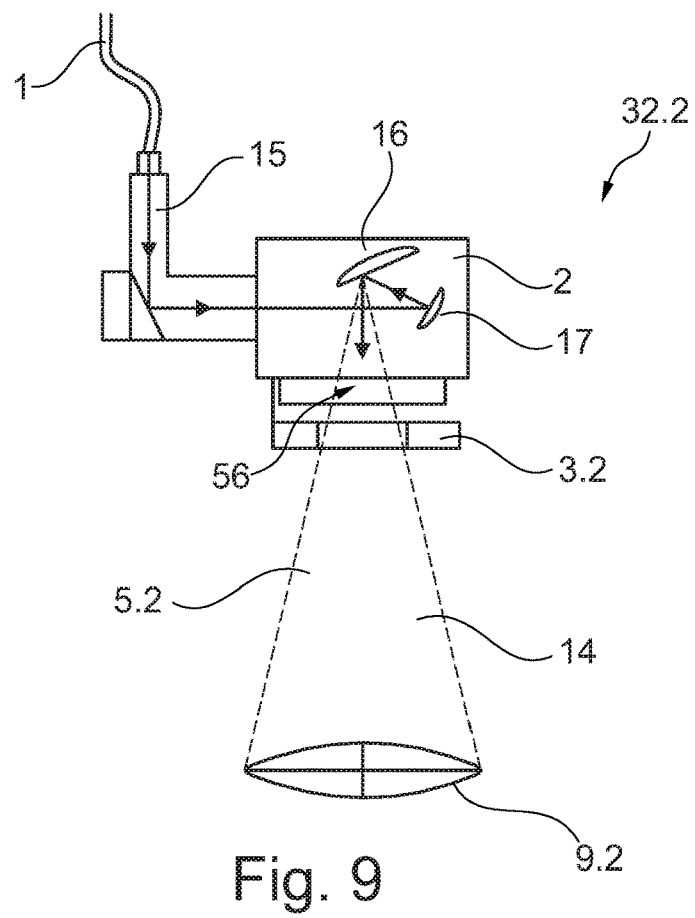
FIG. 9 shows a detailed view of an embodiment of a laser device of the device of the welding assembly according to the exemplary embodiment of FIG. 4.

As the FIGS. 4 and 8 show, the flue/smoke 13 generated during welding can be blown away from the stator 8.1 by means of the air flow.

For laser beam welding of stators 8.1 without local manipulation of the stator 8.1 and the welding optics assembly—laser optics assembly 2—the embodiment of the invention provides in the device 22.2 the combination of a panel lamp 3.2 for completely illuminating the stator 8.1 in combination with a focal length of the laser device 32.2 which permits sufficiently large scanning fields—processing area 9.2—in order to be able to weld the stator 8.1 in its entirety without local manipulation.

The focal length of the laser optics assembly 2 of the laser device 32.2 according to FIGS. 4 to 9 is explained below. It permits the following operating section—i.e., processing area 9.2 at the level of the conductor end assembly 42—of the laser optics assembly 2.

Figure 5:
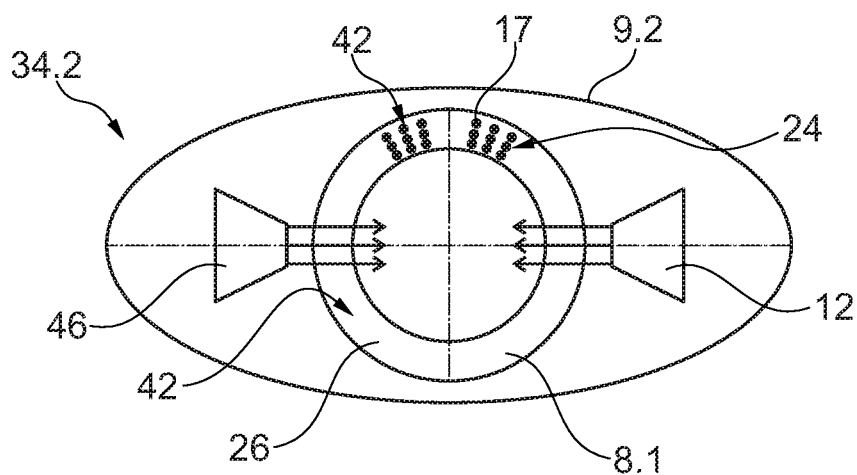
FIG. 5 shows a plan view of the component, held in a mount, of the exemplary embodiment of FIG. 4.

In order to weld together a group of conductor ends 24, in particular of pin pairs, a focal length of the laser optics assembly 2, compared with the comparative example and other known systems, is chosen so as to result in significantly larger processing fields 9.2, in particular with a field area of 300-350 mm or greater, so that the stator 8.1 can be welded stationarily over the entire circumference; in this respect, see FIGS. 4 and 5. The deflecting mirrors 16 installed in the welding optics assembly, in this respect see FIG. 9, permit a deflection of the laser beam 5.2 in such a way that all the pin positions—i.e., all positions of all the groups of conductor ends 24 to be welded together—on the circumference can be reached.

Thus, a rotation of the stator 8.1 in order to move into the processing field the pin pairs to be welded together can be omitted.

A power range of the laser beam source between one and eight kilowatts, a limited power range of three to six kilowatts, and more preferably an even more limited power range of between 4 and 6 kW is provided for welding. The beam diameter in the focal point is preferably to be selected to be 100 to 200 μm in order to attain a desired intensity of the beam of $I>10^6$ W/cm$^2$ with respect to a process in the deep welding mode for materials of the conductor ends 24 that are used, in particular, in this case. The beam is deflected with the scanning device 36.2, which is preferably formed by a 2D or 3D laser optics assembly, also referred to as a scanning head or scanning systems. In one embodiment of the scanning device 36.2, the laser beam 5.2 is guided along the welding contour by galvanometric deflecting mirrors 16, wherein the great dynamics thereof, combined with their low weight, permit a high deflecting speed and, as a result, high welding speeds. The welding process is realized with speeds of between 800 and 1000 mm/s The laser radiation from the laser is guided via light conducting cables 1 having a fiber core diameter of 50 μm, so that the spot diameter of the laser beam 5.2 produced on the component 26, which results from the aspect ratio of the optical components, is within the above-mentioned range. By reducing the fiber core diameter, e.g., by a factor of two, an increase of the working distance is possible with an identical aspect ratio, compared with the comparative example, without resultant intensity losses in the laser radiation. Due to identical beam diameters in the area of the conductor end assembly 42, the intensities required for welding can be realized on the workpiece surface without a stronger laser having to be used. The light conducting cable 1 is connected with the laser optics assembly 2 via a plug 15. The possible emission angles of the laser beam 5.2 are indicated by the laser beam processing area 14.

Preferred embodiments of the illuminating device 28.2 are explained in more detail below.

In the illuminating device 28.2 the light is emitted via a light conductor so as to result in constant light characteristics across the entire surface. The light is emitted via individual bores disposed at a defined distance from each other. They are configured so as to result in a characteristic emission angle, and thus constant light characteristics, across the surface to be illuminated. With respect to the number of bores, the light distribution, etc., the panel lamp 3.2 is dimensioned such that all of the conductor ends 24 of the entire conductor end assembly 42 are illuminated to an extent sufficient so that the position of each group of conductor ends 24 to be welded together can be determined by means of images recorded of the entire conductor end assembly 42 by means of the camera 44. The light is emitted with the light cone 4.2 from the panel lamp 3.2 via the bores, wherein, accordingly, the number and arrangement of the bores across the cross section is designed so as to result in uniform light characteristics.

Embodiments of the optical recognition device 30.2 and the pin detection via vision systems formed therewith are explained in more detail below.

The number of pin pairs detected in the optical recognition device 30.2 formed, for example, by a vision system is maximized in accordance with the image section provided. Thus, the total time for pin detection can be reduced and an advantage with respect to the process can be gained in comparison with individual images as they are used in the comparative example. The pin pairs are not detected via sensors but via imaging methods. In this case, the outer edges of the pins in the transverse and longitudinal directions are determined in accordance with the light/dark differences. The center resulting therefrom is used for positioning the welding contour.

Exemplary embodiments of the flow generation device 46 are explained in more detail below. With it, an air curtain 6.2 can be formed by means of CrossJets 12.

A CrossJet 12 is attached peripherally above the process zone—processing area 9.2 in the region of the conductor end assembly 42—which forms an air curtain 6.2 over the process zone in order to blow flue gases and smoke 13 away from the welding site.

As shown in FIG. 6, a segmented, peripheral arrangement of individual nozzles 48 in a corresponding angled orientation may be provided, or, as FIG. 7, a flow direction oriented towards the center can be obtained. A shielding by flue gases of the laser power emitted towards subsequent pins is thus avoided. In detail, an absorption of the laser radiation 5.2 by the flue gas 13 can be eliminated in the process, so that a constant energy input into the component 26 is made possible. Thus, fluctuations in the quality of the welding results can be avoided because a constant energy input is provided.

The welding station 50 illustrated in FIG. 4 can be integrated as a processing station into a production system for manufacturing the component 26. It has a control system 52 in which corresponding control programs for controlling its components are stored as software.

Figure 10:
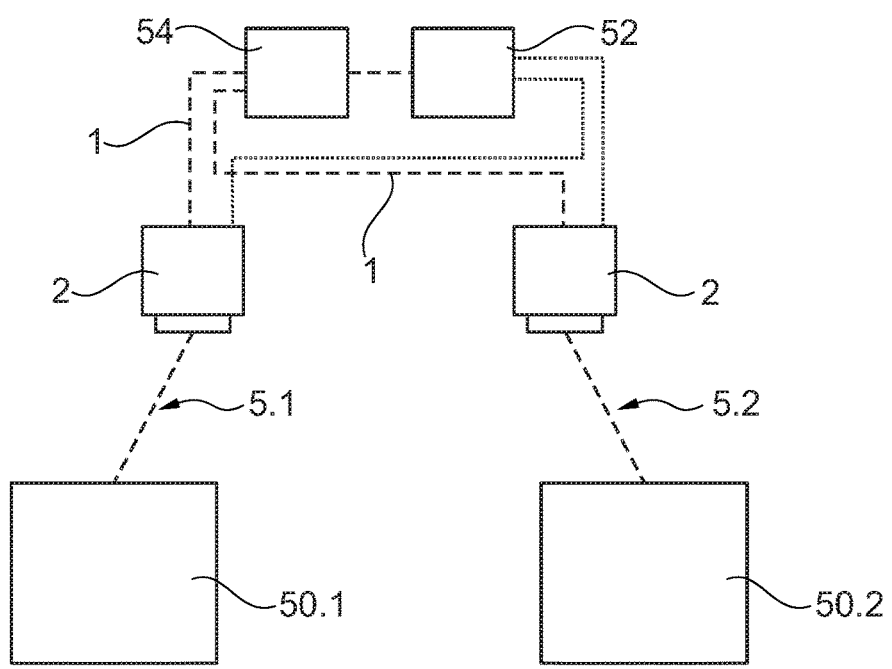
FIG. 10 shows a simplified block diagram of the device for welding together conductor ends according to an embodiment of the invention, comprising a first and a second welding station.

FIG. 10 schematically shows another embodiment of the device 22.2. This embodiment contains several of the welding stations 50 shown in FIG. 4 as sister stations 50.1 and 50.2. Accordingly, the device 22.2 has several laser optics assemblies 2 and several mounts 34.2 disposed in a stationary manner. The welding stations 50.1 and 50.2 share a common laser 54 and a common control system 52. As a result, a time sharing of the laser power can be achieved.

In another embodiment, which is not shown here in any detail, but which is currently preferred, the laser device 32.2 is movable relative to the mount 34.2. This is advantageous, in particular, for particularly large stators. In this case, the laser device 32.2 is configured in such a way that it can process a first partial area of the conductor end assembly 42, e.g., a first segment of a stator with a third of all grooves, in a first position. If all conductor ends of the first partial segment are welded together, the laser device 32.2 is moved, relative to the stator, into a second position in which it can process a second partial area of the conductor end assembly 42. The illuminating device 28.2 is also capable of being moved along accordingly; it is configured for illuminating at least the entire respective partial area. The partial area is designed such that at least four conductor end groups are included. In preferred embodiments, this may be a maximum of 30 to 40 conductor end groups. 20 is quite common; generally, more than 10 conductor end groups overall are included in the partial area.

Compared to previous approaches, exemplary embodiments of the invention have considerable advantages, both with respect to the process as well as with respect to the costs.

The process-related advantages are explained below. Because local manipulation can be omitted, there are no—or at least much fewer—handling-related welding interruptions. Shorter total process times are the result, and thus a significantly lower complexity of the installation. In the first exemplary embodiment, various linear and rotation axes are omitted, that is, in particular, drive units or actuators and their control systems for carrying out linear or rotary movements. Even if—in the other embodiment—a remaining movement between a few partial areas of the stator is carried out, this can be carried out with much less effort, with regard to the process and the installation, than in the prior art. In the case of the time sharing of the laser power for two laser optics assemblies 2 indicated in FIG. 10, the process time can be reduced by the factor 4. Analogously, a reduction of the processing time in the case of a single processing of a stator 8.1 by a factor of 5.5 is possible.

The cost-related advantages are explained below. Embodiments of the invention have direct advantages with regard to the cycle time and the costs for the production device for large-scale production of the components 26. On the one hand, components for handling the stator 8.1 and, if applicable, also the laser optics assembly 2 can be omitted or can be configured in a much simpler manner At the same time, the cycle time can be reduced, and thus the output of components can be increased considerably. In the best case, additional complete welding stations (with a laser), which would be required in the comparative example for processing all components with a predetermined production number, can be saved. As a result, there is a considerable savings potential. In addition to the omission of complete additional welding stations, the number of relevant key components can be reduced. As indicated in FIG. 10, a time sharing can be made possible, so that the considerable costs for an additional laser can be saved while the same output can be achieved as with two of the welding stations of the comparative example with, in each case, their own lasers. In particular, it is possible to supply several welding stations 50.1, 50.2 with a single beam source. In other embodiments, supplying several welding stations with a single laser optics assembly 2 is also possible.

For example, in the embodiment of FIG. 10, the positions of the conductor ends 24 are detected in the first welding station 50.1 by means of the optical recognition device 30.2, while a welding process is carried out by means of the laser device 32.2 in the second welding station 50.2. After this working step has been successfully carried out, the working steps swap the welding stations 50.1, 50.2, i.e., welding is performed at the first welding station 50.1, while the position of the conductor ends 24 of the next component 26 is detected at the second welding station 50.2.

Accordingly, only a single laser 54 is required, which supplies the laser optics assemblies 2 of the welding stations 50.1, 50.2 with laser radiation.

The omission of axes of movement on each station thus results in a savings potential of several 105 €. The omission of an entire station results in a savings potential of more than 106 €.

Of course, modifications of the embodiments shown are possible. Even though the device and the method were explained with reference to the example of the production of stators 8.1, other components, such as rotors, can of course be also manufactured. The device and the method offer significant advantages wherever conductor end pairs or other conductor end groups protrude over a relatively large area from components 26 to be produced in series and are to be connected with each other.

In embodiments of the device 22.2 and of the method carried out therewith according to embodiments of the invention, neither the optics assembly nor the component 26 have to be moved, or only few movements have to be carried out in between the processing of few partial areas. While the pin pairs protruding from a large number of grooves are welded together, the laser beam 5.2 can be directed, solely by means of the laser optics assembly 2.2 of the laser device 28.2, from the laser optics assembly, which is now fixed or can be moved with less effort, onto all wire ends of a component 26, such as a stator 8.1 or rotor, to be welded together. Compared with the comparative example, in particular, a lens 56 in the laser optics assembly 2 which focuses onto a larger focal length is chosen on the one hand. On the other hand, a higher intensity can also be achieved due to smaller diameters. A larger processing field 9.2 can be attained by the greater working distance. All wire ends of a conductor end assembly 42 distributed even across a larger surface area can be reached by deflecting the laser beam.

Moreover, the wire ends are illuminated together, so that an image recognition of the entire conductor end assembly, which may also be distributed across a larger surface area, is made possible, whereby the deflection of the laser beam 5.2 is controlled.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Light conducting cable
2 Laser optics assembly (scanner)
3.1 Ring light
3.2 Panel light
4.1 Light cone ring light
4.2 Light cone panel light
5.1 Laser beam
5.2 Laser beam
6.1 Air curtain
6.2 Air curtain
7.2 Clamping device
8.1 Stator
9.1 processing field on component
9.2 processing field on component
10 Coordinate system
11 Direction of rotation
12 Air nozzle
13 Flue gas/smoke
14 Processing area (laser beam)
15 Plug light conducting cable
16 Deflecting mirror
17 Hairpins
20.1 Welding assembly
20.2 Welding assembly
22.1 Device
22.2 Device
24 Conductor ends
26 Component
28.1 Illuminating device
28.2 Illuminating device
30.1 Optical recognition device
30.2 Optical recognition device
32.1 Laser device
32.2 Laser device
34.1 Mount
34.2 Mount
36.1 Scanning device
36.2 Scanning device
40 Central axis
42 Conductor end assembly
44 Camera
46 Flow generation device
50 Station
50.1 First welding station
50.2 Second welding station
52 Control system
54 Laser
56 Lens

The invention claimed is:

1. A device to weld together conductor ends disposed on a component of an electric machine in a conductor end assembly, comprising:
   an illuminating device to illuminate at least one partial area of the conductor end assembly, wherein the at least one partial area contains a plurality of conductor ends to be welded together into a plurality of groups of conductor ends, wherein each conductor end is only in a single group and only welded to conductor ends in the single group,
   an optical recognition device to recognize a position of the illuminated conductor end assembly, wherein the optical recognition device is configured to record at least one image of the at least one partial area which contains the plurality of the conductor end groups to be welded together and detecting positions of each of the plurality of the conductor end groups by image processing on the image,
   a laser device capable of directing, depending on the recognized position, a laser beam onto each of the groups of the conductor ends, which is to be welded together, of the at least one partial area, and
   a mount with a clamping device which functions as a welding template, which is configured to hold the component stationary relative to the laser device during a welding process to weld together all conductor end groups of the at least one partial area,
   wherein the laser device is held in a stationary manner during the processing of at least two of the at least one partial areas of the conductor end assembly with a plurality of conductor end groups to be welded together and is moved only in order to switch to different partial areas of the at least one partial areas of the conductor end assembly.

2. The device according to claim 1, wherein the illuminating device has at least one or several of the following features:
   a panel lamp to illuminate an entire portion of the conductor end assembly;
   an assembly of individual light sources;
   an assembly of individual bores to form individual light sources;
   a uniform distribution of individual light sources;
   a light conducting device to uniformly distribute light power to individual light sources; and
   an illuminating optics assembly to illuminate the entire conductor end assembly.

3. The device according to claim 1, wherein the laser device at least one of:
   is stationary;
   is or includes a laser optics assembly with a laser beam entrance to input a laser beam, a scanning device to direct the laser beam and at least one lens to influence the laser beam;

is configured to deflect the laser beam over a processing area at the conductor end assembly, which processing area has a diameter of 300 mm or more;

has a laser beam source with a power range between 1 and 8 kW;

is configured to obtain a laser beam with a beam diameter at a focus of between 50 μm and 200 μm, is configured such that a laser radiation with an intensity I of I>106 W/cm2 is obtained by setting the beam diameter at the conductor end assembly;

has a light conducting cable to guide the laser beam towards the scanning device; or has a light conducting cable with a fiber core diameter of 50 μm to 300 μm, disposed upstream of the scanning device in a beam direction.

4. The device according to claim 1, wherein at least one of:

a flow generation device to generate a gas flow over the conductor end assembly is provided, or several nozzles are provided to generate a gas flow, which gas flow is in a direction angled at least partially toward a tangential direction relative to an outer circumference of the component, at the conductor end assembly.

5. The device according to claim 1, wherein a stationary welding template with openings, in which the conductor ends of the conductor end assembly that are to be welded together are to be accommodated, is provided.

6. The device according to claim 1, further comprising a first and a second welding station, which are supplied with laser power by a common laser beam source.

7. A welding assembly, comprising the device according to claim 1 and the component.

8. A method to weld together conductor ends disposed on a component of an electric machine in a conductor end assembly, comprising:

a) illuminating at least one partial area of the conductor end assembly, wherein the at least one partial area contains a plurality of conductor ends to be welded together into a plurality of groups of conductor ends, wherein each conductor end is only in a single group and only welded to conductor ends in the single group, b) optically recognizing a position of the conductor ends of the illuminated conductor end assembly by recording at least one image of the at least one partial area which contains the plurality of groups of the conductor ends to be welded together and carrying out image processing in order to detect the position of each of the groups of the conductor ends to be welded together within the at least one partial area, c) deflecting a laser beam delivered from a laser device, depending on the recognized position, onto each of the groups of conductor ends, which is to be welded together, for the at least one partial area, and d) wherein the component is held stationary by a mount with a clamping device which functions as a welding template, during a welding process of step c), relative to the laser device delivering the laser beam, and the laser device is held in a stationary manner during the processing of at least two of the at least one partial areas of the conductor end assembly with a plurality of conductor end groups to be welded together and is moved only in order to switch to different partial areas of the at least one partial areas of the conductor end assembly.

9. The method according to claim 8, wherein step a) comprises at least one or more of the following steps:

illuminating the conductor end assembly with light characteristics that are constant across the at least one partial area or an entire processing surface including the conductor end assembly;

guiding light for light emission to illuminate by means of a light conductor, illuminating by means of a uniform assembly of individual light sources;

emitting the light through an assembly of bores as individual light sources; or guiding and influencing the light for illumination by means of at least one illuminating optics assembly.

10. The method according to claim 8, wherein step b) comprises at least one or more of the following steps:

recognizing the position, by means of imaging processes, of conductor ends to be welded together;

recording at least one image of at least one section of the processing surface including the conductor end assembly;

recording at least one image of an entire area of the conductor end assembly;

recognizing edges of conductor ends in the recorded image and computing, based on recognized edges, a position of a center of a group of conductor ends to be welded together;

recognizing differently oriented edges of conductor ends in the recorded image to detect a position of a group of conductor ends to be welded together;

recording at least one image by means of a camera disposed in or on a stationary laser optics assembly including a scanning device to carry out step c); or recording at least one image of at least 4 to 40 groups of conductors and detecting a position of these groups by means of image processing.

11. The method according to claim 8, wherein step c) comprises at least one or more of the following steps:

guiding laser light with a power of 1 to 8 kW to a scanning device;

guiding laser light to a scanning device by means of a light conducting fiber with a fiber core diameter of 50 μm to 300 μm;

setting a beam diameter of 100 μm to 200 μm at the welding site on the group of conductor ends to be welded together;

setting a beam diameter at a welding site on the group of conductor ends to be welded together, such that a beam intensity of preferably more than 106 W/cm² is attained;

carrying out the welding process at speeds of 200 to 1000 mm/s; or scanning the laser beam over a processing area at the conductor end assembly, which processing area has a diameter of 300 mm or more.

12. The method according to claim 8, wherein step d) comprises at least one or more of the following steps:

holding the component stationary;

disposing the conductor end assembly in a stationary welding template;

using a stationary laser device including the scanning device and at least one lens.

13. The method according to claim 8 including at least one or several of the following steps:

generating a gas flow over the conductor end assembly during welding;

generating several individual gas flows directed at least partially in a tangential direction, to generate a circulating gas flow over the conductor end assembly during welding; or generating a radially directed gas flow over the conductor end assembly.

14. The method according to claim 8, wherein the method is carried out at a first welding station and at a second welding station using the same laser to generate the laser beam.

15. The method according to claim 14, wherein, simultaneously, the steps a) and b) run on one of the first and second welding stations, alternating with step c) on another of the first and second welding stations after steps a) and b) have been run on the another of the first and second welding stations.

16. A device to weld together conductor ends disposed on a component of an electric machine in a conductor end assembly, comprising:

an illuminating device to illuminate at least one partial area of the conductor end assembly, wherein the at least one partial area contains a plurality of conductor ends to be welded together into a plurality of groups of conductor ends, wherein each conductor end is only in a single group and only welded to conductor ends in the single group, an optical recognition device to recognize a position of the illuminated conductor end assembly, wherein the optical recognition device is configured to record at least one image of the at least one partial area which contains the plurality of the conductor end groups to be welded together and detecting positions of each of the plurality of the conductor end groups by image processing on the image, a laser device capable of simultaneously directing, depending on the recognized position, a laser beam onto each of the groups of the conductor ends, which is to be welded together, of the at least one partial area, a mount with a clamping device which functions as a welding template, which is configured to hold the component stationary relative to the laser device during a welding process to weld together all conductor end groups of the at least one partial area, and a first and a second welding station, which are supplied with laser power by a common laser beam source.

* * * * *